United States Patent [19]
McDonald

[11] 3,817,478
[45] June 18, 1974

[54] VEHICLES FOR GLIDING FLIGHT

[76] Inventor: George McDonald, 718 Whitney Ave., Apt. 402, Hamilton, Ontario, Canada

[22] Filed: Jan. 11, 1973

[21] Appl. No.: 322,834

[52] U.S. Cl. ............................ 244/16, 244/22
[51] Int. Cl. ............................... B64c 31/02
[58] Field of Search ...................... 244/22, 16, 4

[56] References Cited
UNITED STATES PATENTS

| 95,513 | 10/1869 | Quinby | 244/64 |
|---|---|---|---|
| 582,757 | 5/1897 | Mouillard | 244/16 |
| 1,989,755 | 6/1934 | Jelalian | 244/22 |

FOREIGN PATENTS OR APPLICATIONS

| 24,509 | 10/1912 | Great Britain | 244/22 |

Primary Examiner—Albert J. Makay
Assistant Examiner—Donald W. Underwood
Attorney, Agent, or Firm—Stanley J. Rogers

[57] ABSTRACT

In an air vehicle intended for gliding there are provided two wing members and a tail member connected to a fuselage member and controllable respectively by the arms and legs of the pilot. The wing members are provided with spring arrangements constituted by respective cantilever arm members and an interconnecting tensile cord connected at its ends to the wing members and passing through swiveling eyelets at the ends of the arms. As the wing members are moved from a central position in either the upstroke or the downstroke the cord tension increases from a minimum value that steadies the wing members in the neutral position and provides a restoring force assisting in producing smooth stroking of the wing members.

6 Claims, 4 Drawing Figures

PATENTED JUN 18 1974

3,817,478

VEHICLES FOR GLIDING FLIGHT

FIELD OF THE INVENTION

The present invention relates to vehicles for gliding flight, and in particular to an air vehicle adapted for aerial flight under the direct guidance of a human pilot. Such vehicles generally include a pair of hand operated wings, a tail and, in some cases, a fuselage member to which the wings and tail may be attached.

REVIEW OF THE PRIOR ART

While ornithopter air vehicles have been proposed since the days of the legendary Icarus, their practical development has been hindrered by several unresolved problems. For example, to prevent the wings from being pulled out of the pilot's hands at the top of an upstroke, and to permit relaxed gliding flight, positive wing stops have been employed to hold the wings in a predetermined position, such as a neutral position.

One disadvantage of such wing stops is that they prevent smooth and uninterrupted stroking of the wings. It will be appreciated for example that the pilot's arms experience a significant shock or jarring effect at the top of each upstroke as the upward motion of the wings is abruptly arrested by the wing stops.

A further disadvantage of such prior art wing stops is that they are arranged to stop the wings in a so-called neutral position so as to permit the pilot to relax during horizontal gliding flight. As a result, the wing stops permit only short, choppy, downward strokes of the wings.

DEFINITION OF THE INVENTION

It is an object of the present invention to provide an air vehicle for gliding flight which permits the pilot to use his strength more efficiently than heretofore.

It is another object to provide an air vehicle which permits long, smooth stroking of the wings by the operator.

It is a further object to provide an air vehicle including means assisting the operator to maintain the wings in a neutral position.

In accordance with the present invention there is provided an air vehicle adapted for gliding flight under the direct guidance of a human pilot, said vehicle comprising an elongate fuselage member for attachment to an operator, a pair of wing members hingedly connected to opposite respective sides of said fuselage member for pivotal motion relative thereto in opposite upward and downward directions from a pre-determined central position, said wing members each having a handle on the corresponding lower surface thereof for grasping by the operator; spring means connected to each of the wing members; spring-tensioning means engaging the spring means for maintaining the spring means at minimum tension when the wing members are in said pre-determined neutral position and for increasing the tension of the spring means as the wing members are moved upward and downward to either side of said neutral position; and a tail member hingedly connected to the elongate fuselage and manipulatable by the operator.

According to a preferred aspect of the invention, the spring means comprises an elastic cord with the ends thereof attached to the respective wing members at the upper surfaces thereof. Preferably, the spring-tensioning means comprises a pair of cantilever members projecting upwardly from the respective wing members, each arm member having the elastic cord passing therethrough, said arm members being mutually offset along the longitudinal axis of the fuselage member to prevent contact between them during upward and downward motion of the wing members, said arm members being designed and constructed so that the elastic cord is at minimum tension when the wings are in said neutral position, and said tension is increased by relative movement of the arm members in both upward and downward wing member motion.

DESCRIPTION OF THE DRAWINGS

For a better understanding of the present invention and its advantages, reference may be made to the following detailed description of a preferred embodiment, given by way of example only, taken in conjunction with the appended diagrammatic drawings, wherein.

DESCRIPTION OF THE PREFERRED EMBODIMENTS

Figure 1:
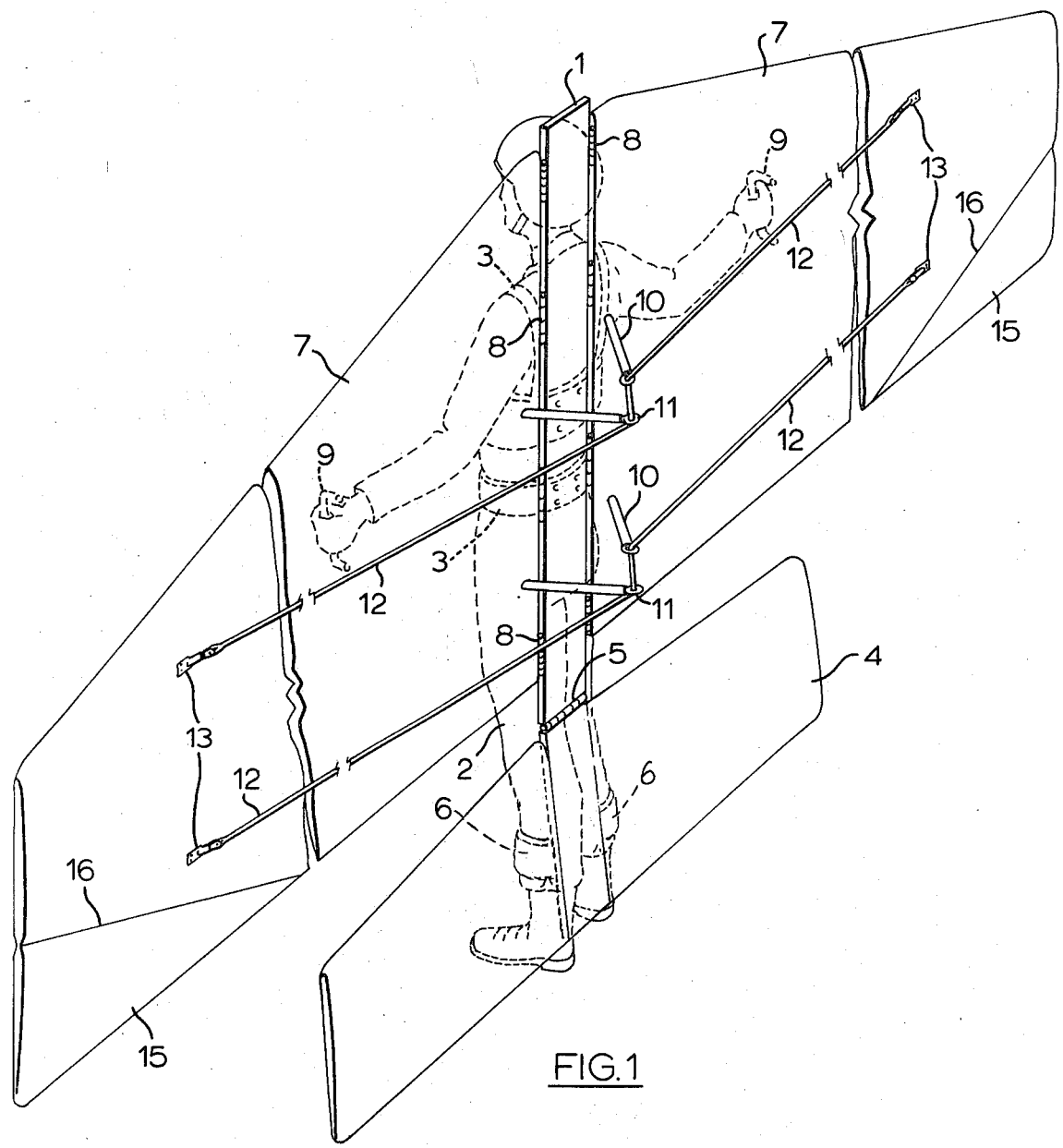
FIG. 1 is a perspective view of one embodiment of the vehicle of the invention.

The air vehicle specifically illustrated comprises a fuselage member 1, which is fastened to the body of the pilot or operator 2 by any suitable means illustrated herein as harness straps 3. The fuselage member extends above the head of the pilot to provide additional protection therefor, especially when landing. A tail member 4 is connected to the fuselage member by a hinge 5, and is anchored to the legs of the pilot by means such as the stirrups 6 illustrated herein, so that the attitude of the tail can be controlled thereby. The hinge connection between the tail and fuselage members is constructed so that the tail cannot be moved more than 30° upward from the horizontal and constitutes a stop member preventing any further motion. The stirrups 6 are constructed to permit each leg to be removed separately, so that one leg can control the tail while the other is poised for landing free of its stirrup.

A pair of wing members 7 (shown broken along their length for ease of illustration) are connected to the fuselage member by longitudinally spaced hinges 8, and each is provided with a handle 9 for grasping by the respective hand of the pilot, to permit the wings to be flapped by corresponding motions of the pilot's arms. Each wing member is provided immediately adjacent to the wing root with two upstanding longitudinally-spaced cantilever arms 10 each carrying at its outer end an eyelet 11 pivoted about an axis extending lengthwise of the arm. An elastic cord or equivalent spring means tensile member 12 is anchored at each end 13 to a different one of the wing members and passes through the two eyelets 11 at the ends of the two cooperating arms. In this embodiment the cord ends are attached to the wing members at points further from the central longitudinal axis 14 of the fuselage member than the respective handles 9.

The trailing portions 15 of the wing tips are made flexible and/or are made to flex readily about a junction line 16 illustrated in FIG. 1. The trailing portions therefore will bend upwards under the effect of its motion through the air as the manned vehicle descends under gravity, giving a forward motion to the vehicle in its descent. A similar effect is produced by the tail as it is held in an upwardly inclined altitude by the operator.

Figure 2:
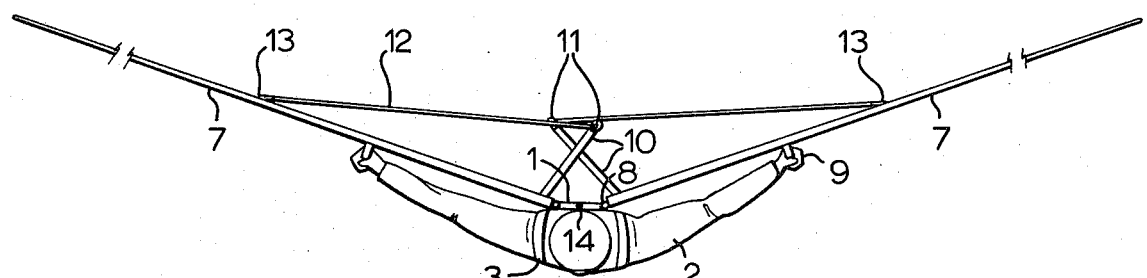
FIG. 2 is a plan view from above of the vehicle of FIG. 1 and showing the wings thereof in an upbeat position.
Figure 3:
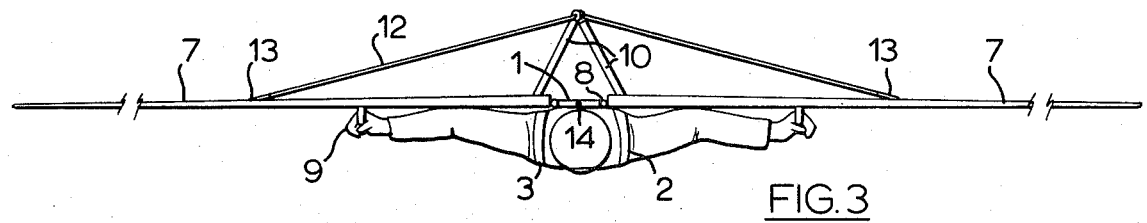
FIG. 3 is a similar view to FIG. 2 when the wings are in a neutral position.
Figure 4:
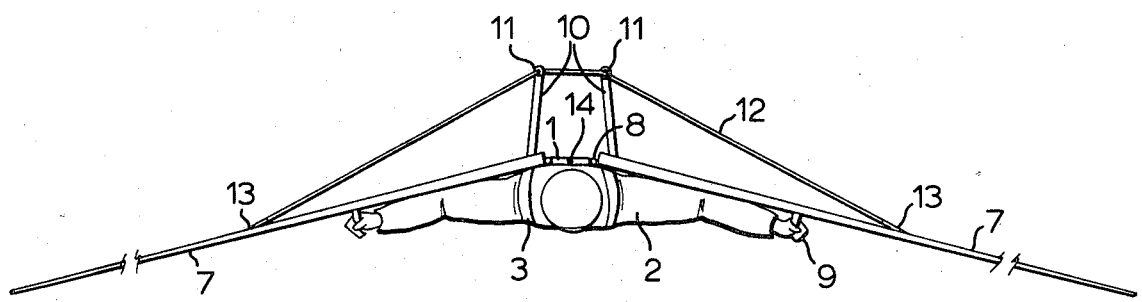
FIG. 4 is a similar view to FIG. 2 when the wings are in a downbeat position.

When the wing members are in a neutral position, which is illustrated herein as having the two members coplanar, the two eyelets of each cooperating pair of arms are aligned with one another parallel to and above the said longitudinal axis 14 and the elastic cord has minimum but positive tension therein to hold the wing members steady in that position. If one or both of the wing members is moved in either an upbeat (FIG. 2) or a downbeat (FIG. 4), then the ends of the two arms move apart and the associated cord is extended, so that the resulting increase in tension applies a restoring force to the wing members tending to return them to the neutral coplanar position. The cords are able to slide freely through the eyelets which, together with the swivelling or pivoting movement thereof about their axes, ensures that the wing members can be stroked smoothly in either direction.

The cantilever arms 10 are inclined toward each other with the result that a downstroke of a certain angularity produces a greater increase in tension in the cords than an upstroke of the same angularity, resulting in a greater restoring force for downstrokes than for upstrokes. The hinge connections between the wing members and the fuselage member are constructed to ensure that the upstrokes and downstrokes cannot exceed a predetermined angularity, usually about 30 degrees from neutral, that would represent too great a physical strain on the pilot.

It will be seen that as the pilot or operator makes a stroke in either direction the cord (or cords if more than one is used) is smoothly tensioned, and at the end of a stroke this tension is available to assist the pilot in reversing the direction of stroking. The tension in the cords will always balance between the two wing members even if only one is operated. In the neutral position the small amount of tension provided by the cords steadies the wing members against small movements and assists in relieving the pilot's arm muscles in this regard. In the embodiment illustrated the wing members are coplanar in their neutral position, but in other arrangements they may have a predetermined dihedral, or even an anhedral, depending upon the attitude that is most efficient for satisfactory gliding, which is the predominant mode of operation for any man-operated air vehicle.

Although in this embodiment two cords 12 are illustrated, in other embodiments one cord or more than two cords may be employed, each with its respective pair of arms 10, or with more than one cord for each pair of arms. The flexible portions 15 of the wings permit the gliding characteristics of the wings to be changed by small amounts to the optimum required.

I claim:
1. An air vehicle adapted for gliding flight under the direct guidance of a human pilot, said vehicle comprising:
   a. an elgonate fuselage member for attachment to an operator;
   b. a pair of wing members hingedly connected to opposite respective sides of said fuselage member for pivotal motion relative thereto in opposite upward and downward directions from a pre-determined central position, said wing members each having a handle on the corresponding lower surface thereof for grasping by the operator;
   c. spring means connected to each of the wing members;
   d. spring-tensioning means engaging the spring means for maintaining the spring means at minimum tension when the wing members are in said pre-determined neutral position and for increasing the tension of the spring means as the wind members are moved upward and downward to either side of said neutral position; and
   e. a tail member hingedly connected to the elongate fuselage member and manipulatable by the operator.

2. An air vehicle as claimed in claim 1, wherein:
said spring means comprises an elastic tensile cord with the ends thereof attached to the respective wing members; and
said spring-tensioning means comprises a pair of arm members projecting upwardly from the respective wing members, each arm member having the elastic cord passing therethrough, said arm members being mutually offset along the longitudinal axis of the fuselage member to prevent contact between them during upward and downward motion of the wing members, said arm members being designed and constructed so that the elastic cord is at minimum tension when the wings are in said neutral position, and said tension is increased by relative movement of the arm members in both upward and downward wing member motion.

3. An air vehicle as claimed in claim 2, wherein the ends of the elastic cord are attached to the respective wing members at points which are farther from the longitudinal axis than the corresponding handles.

4. An air vehicle as claimed in claim 2, wherein each arm member has pivoted thereto about an axis lengthwise of the member an eyelet through which the elastic cord passes freely to permit smooth extension and contraction thereof.

5. An air vehicle as claimed in claim 2, wherein the two arm members are inclined toward each other whereby an upstroke of predetermined angularity produces a smaller increase in tension of the elastic cord than a downstroke of the same angularity.

6. An air vehicle as claimed in claim 2, wherein each wing member is provided with two longitudinally spaced arm members and there are provided two tensile cords each cooperating with a respective pair of arm members.

* * * * *